US006500562B1

(12) United States Patent
Hosoi et al.

(10) Patent No.: US 6,500,562 B1
(45) Date of Patent: Dec. 31, 2002

(54) ELECTROPHOTOGRAPHIC TRANSFER SHEET AND COLOR IMAGE FORMING PROCESS

(75) Inventors: Kiyoshi Hosoi, Ebina (JP); Ryosuke Nakanishi, Ebina (JP); Tomofumi Tokiyoshi, Koto-ku (JP); Masaru Kato, Koto-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/572,858

(22) Filed: May 18, 2000

(30) Foreign Application Priority Data

May 20, 1999 (JP) .......................................... 11-140361

(51) Int. Cl.[7] ............................................... B32B 29/00

(52) U.S. Cl. ....................... 428/500; 428/211; 428/507; 428/511; 428/514; 428/515; 428/219; 428/537.5; 430/124; 430/126

(58) Field of Search ................................ 428/500, 507, 428/515, 511, 514, 211, 219, 537.5; 430/126, 124

(56) References Cited

U.S. PATENT DOCUMENTS 4,778,711 A * 10/1988 Hosomura et al. .......... 428/211
5,443,902 A * 8/1995 Knox et al. ................. 428/340
5,637,383 A * 6/1997 Sakurai et al. .............. 428/211
6,042,985 A * 3/2000 Matsuda et al. ............ 430/126

FOREIGN PATENT DOCUMENTS

| | | | |
|---|---|---|---|
| JP | 6-19178 | | 1/1994 |
| JP | 09099652 | * | 4/1997 |

* cited by examiner

*Primary Examiner*—Timothy Meeks
*Assistant Examiner*—Elena Tsoy
(74) *Attorney, Agent, or Firm*—Oliff & Berridge, PLC

(57) ABSTRACT

An electrophotographic transfer sheet having a coating layer on at least one surface base material made of pulp fibers as a main body provided. The elongation of the sheet in the cross direction when the humidity is changed from 25% RN to 90% RH at 20° C. is not higher than about 0.65% and the water content of the sheet at opening its package as measured according to JIS P8127 is approximately in the range from 3.5 to 6.5%. A method of forming a color image using color toners each containing a polyester resin having Mn in the range of from about 1,000 to 9,000 and using the above-described electrophotographic transfer sheet is also provided.

14 Claims, 1 Drawing Sheet

ELECTROPHOTOGRAPHIC TRANSFER SHEET AND COLOR IMAGE FORMING PROCESS

FIELD OF THE INVENTION

The present invention relates to a transfer sheet used as a transfer material in a copying machine and a printer of an indirect dry electrophotographic system and to a color image forming process of forming a color toner image on the above-described transfer sheet and fixing the toner image by pressing and/or heating.

BACKGROUND OF THE INVENTION

Hitherto, with the increase in the requirement of a color image formation and digital image formation by a copying machine and a printer of an electrophotographic system, improvement of the image quality of an electrophotographic system has been investigated. Particularly, in a full color copying machine or printer of an electrophotographic system, to obtain images of a high image quality, the employment of a digital system proceeds for the input and output of images, and an image-input method, a processing method of the input images, a development method, a transfer method, a fixing method, etc., have been largely improved. Also, the developer and the image-forming material for a photoreceptor have been improved in response to the digital high precision and high-coloring color recording. Furthermore, because color toners are required to have a good melting property and a good color mixing property at applying heat in a fixing apparatus, color toners having a low softening temperature are generally used.

On the other hand, in a full-color copying machine and printer of an electrophotographic system, transfer sheets of mainly a wood free paper base have been used but recently the improvement of the image quality by the increase of the resolution of a full-color copying machine and printer has made further progress and in order to obtain full-color images of a high image quality having high-grade feeling and a high coloring property and without having roughness, coated papers having a coating layer made of a pigment and a binder resin have been frequently used as the transfer sheets.

Furthermore, in a full-color copying machine or printer of an electrophotographic system, when a full-color image is formed by transferring toner images and fixing the transferred images using color toners having particle sizes of from several $\mu$m to several tens $\mu$m, in the case of using a wood free paper having many voids on the surface thereof as the transfer sheet, the protuberance of the toner is not so large but in the case of using a transfer sheet having less voids on the surface layer and having an air permeability of at least 100 seconds, the protuberance of the toner becomes large particularly at a high-density image portion and a continuous film is liable to from. Also, to improve the melting property and color mixing property of color toners, a binder resin, such as a polyester resin having a low molecular weight of from about 2,000 to 9,000 as the number average molecular weight Mn is mainly used for the color toners but the toner fixed on a coated paper on which a continuous film is liable to form, the behavior of the toner cannot overtake the expansion and contraction of the coated paper caused by the change in humidity and it sometimes happens that an imaged portion is crazed.

For solving these problems, Japanese Patent Laid-Open No. 19178/1994 proposes a method of preventing the occurrences of crazing on the coating layer of a coated paper and crazing of images formed thereon due to a long-term storage and impact by incorporating a styrene-butadiene copolymer in a transparent resin coating layer made of a styrene-acryl-based resin. However, when a paper is used as the base material of a transfer sheet, the behavior of a toner on the coating layer and at the imaged portion cannot overtake the elongation of the base material at high humidity and imaged portion is sometimes crazed.

SUMMARY OF THE INVENTION

The present invention has been made for solving the above-described problems and provides an electrophotographic transfer sheet using a paper-base coated paper mainly made of pulp fibers, which does not cause crazing at the imaged portions even under high humidity, shows high coloring of images, and does not give roughness.

An aspect of the present invention is an electrophotographic transfer sheet having a base material made of pulp fibers as a main body having formed on at least one surface thereof a coating layer. An elongation of the sheet in the cross direction when a humidity is changed from 25% RH to 90% RH at a temperature of 20° C. is not higher than about 0.65% and a water content of the sheet at opening a package thereof as measured according to JIS P8127 is approximately in the range from 3.0 to 6.5%.

Another aspect of the present invention is an electrophotographic transfer sheet having a base material made of pulp fibers as a main body. At least about 30% by weight of the pulp fibers are a dry pulp, and a water content of the sheet at opening a package thereof as measured according to JIS P8127 is approximately in the range from 3.0 to 6.5%.

Another aspect of the present invention is also an electrophotographic transfer sheet having a base material made of pulp fibers as a main body having formed on at least one surface thereof a coating layer. The coating layer is a transparent resin layer made of a thermoplastic resin as a main constituent, a fiber orientation ratio of the base material is approximately in the range from 1.05 to 1.45, and a water content of the sheet at opening a package thereof as measured according to JIS P8127 is approximately in the range from 3.0 to 6.5%.

Another aspect of the present invention is a process of forming a color image by transferring a color toner image formed by an electrophotographic process onto an electrophotographic transfer sheet and fixing the transferred toner image by applying heat. The color toner contains a polyester binder resin having a number average molecular weight Mn approximately in the range from 1,000 to 9,000, and the electrophotographic transfer sheet is the transfer sheet described in the above aspects.

DETAILED DESCRIPTION OF THE INVENTION

Figure 1:
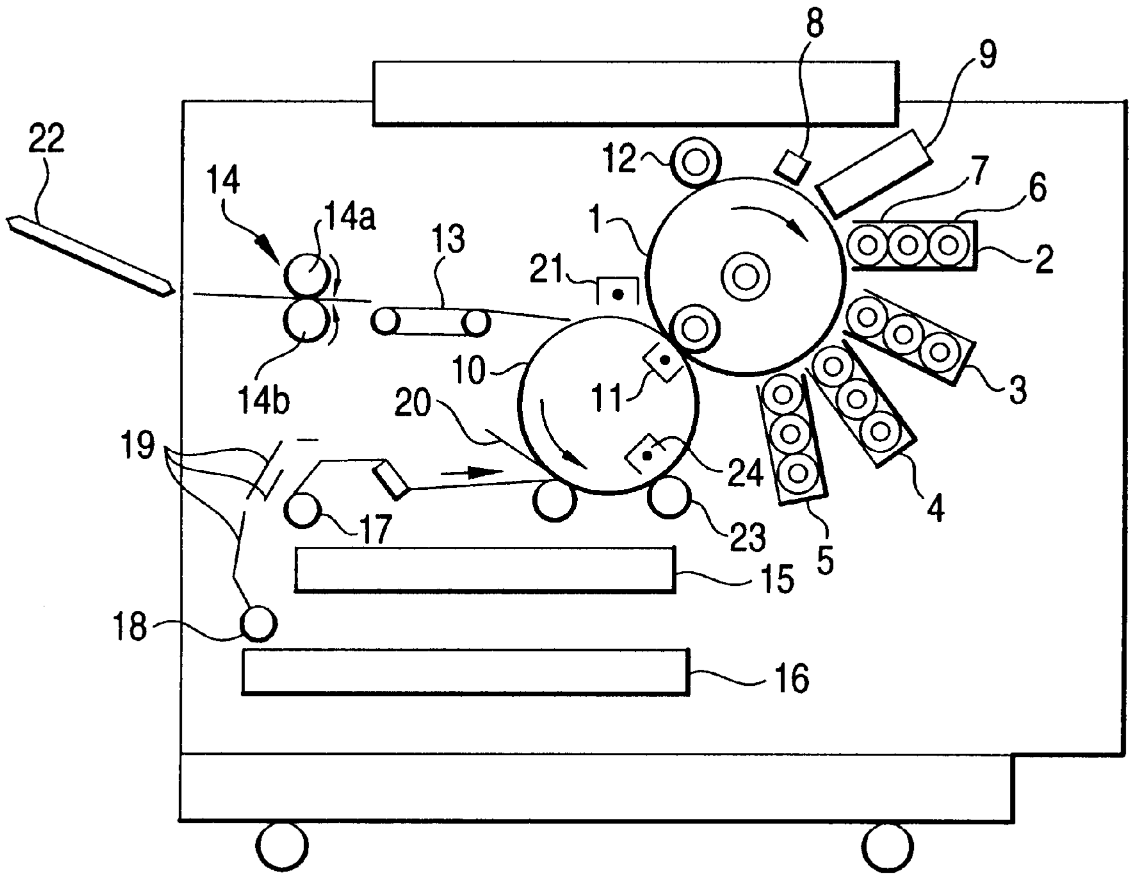
FIG. 1 is a schematic cross-sectional view of an embodiment of an indirect dry electrophotographic apparatus used for forming color images on the electrophotographic transfer sheet of the invention.

The invention is described in detail below.

As a result of various investigations for preventing the occurrence of crazing at the toner image portion transferred and fixed onto a coated paper under a high humidity by paying special attention to the elongation of the coated paper in the cross direction, when the state of an electrophotographic transfer sheet is changed from a low-humidity environment to a high-humidity environment, the present inventors have found that the above-described problems can be solved and have succeeded in accomplishing the present invention.

In general, in paper-base base material made of pulp fibers as the main body, the fibers are aligned to the flow direction (MD direction) of a paper machine. The rectangular direction to the MD direction is a cross direction. A simple distinguishing method of the cross direction regarding a coated paper is that in the lengthwise and the lateral directions, the weak nerve direction is the cross direction. For example, in a coated paper of an A4 size (210 mm×297 mm), when the lengthwise direction at making the base paper is the flow direction of the paper machine, the width direction is the cross direction. A coated paper made by forming a coating layer on the above-described paper-base base material shows an elongation by the change in humidity and in this case, the elongation is larger in the cross direction having a relatively weak nerve than the MD direction of aligning fibers.

Hitherto, the coated papers of a paper-base base material mainly made of pulp fibers all show the elongation of at least 0.8% in the cross direction at changing humidity. In printing, the large elongation as described above gives no problem in use and on the contrary, the reduction of the elongation is not practical because of increasing the production cost.

On the other hand, when the coated paper of prior art is used as a transfer sheet for electrophotography, the toner image formed therein is crazed as described above. To prevent the occurrence of crazing, it is important that the coated paper does not show a large elongation when exposed under a high humidity. To this end, it has been found that by restraining the elongation of a coated paper in the cross direction at changing from a low-humidity environment to a high-humidity environment to a definite value or lower and maintaining the water content in the paper at a definite range so that the water content does not become too low, the occurrence of crazing described above can be prevented.

It has now been found that in the electrophotographic transfer paper of this invention, by defining the elongation of the paper in the cross direction in the case of changing the humidity from 25% RH to 90% RH at a temperature of 20° C. to about 0.65% or lower and defining the water content of the paper provided by JIS P8127 to the range of from about 3.0 to 6.5%, crazing at the toner image portion at the high humidity does not occur. In this invention, it is preferred that the elongation in the cross direction is defined to about 0.6% or lower and the water content of the paper is defined to be in the range of from about 3.5 to 6.0%.

The elongation of the paper in the cross direction in the invention was measured by the following method. First, the paper was cut to 100 mm in the cross direction and to 50 mm in the MD direction to provide a measurement sample. The sample was set in a geometric-exchange type extensometer (manufactured by Oji Koei) and the sample paper was previously subjected to moisture conditioning by the method according to JIS P8111. The measurement of the elongation was carried out by applying a tension of a half of the weight of the sample paper. At the beginning, the humidity was conditioned to 65% RH at a temperature of 20° C., after keeping the sample paper for 1 hour to carry out a zero point control, and after keeping at the humidity of 25% RH for 1 hour under the same temperature environment, the elongation A in the cross direction was measured. Then, after further keeping the sample for 1 hour at the humidity of 65% RH and then for 1 hour at the humidity of 90% RH, the elongation B in the cross direction was measured again. Also, the value obtained by subtracting A from B was defined as the elongation in the cross direction in this invention.

As a method of reducing the elongation of a coated paper in the cross direction, there are a method of reducing the elongation of the base material used, a method of coating a thermoplastic resin on the paper, etc., and the practical embodiments of the method are illustrated below but the method in the invention is not limited to them.

As the method of reducing the elongation of the base material, (1) a method that at making the base material, the raw material jetting speed/the paper machine Wire speed ratio (JET/WIRE ratio) is controlled to reduce the fiber orientation ratio (T/Y ratio), (2) a method that at making the base material, after pressing, while applying a proper restrictive force corresponding to the fiber aligning ratio to the lateral direction of the base material, the base material is dried by a dryer, (3) a method of using or compounding dry pulp, using or compounding a pulp of restrained beating as the pulp for the base material, etc., and they can be properly selected according to the purposes. In this case, the dry pulp is a sheet-form pulp dried by a pulp machine, etc., such that the water content becomes from about 10 to 40%.

As the method of coating a thermoplastic resin, there is a method of properly selecting and utilizing thermoplastic resin having a large molecular weight. When a thermoplastic resin having a large molecular weight is coated, the elongation of the whole paper is restrained by the resin coated film and the elongation in the cross direction is reduced.

In addition, the above-described fiber orientation ratio (T/Y ratio) is the longitudinal wave propagation speed ratio of ultrasonic wave pulse and the T/Y ratio means (the ultrasonic wave propagation speed in MD)/(the ultrasonic wave propagation speed in cross direction). For the measurement, SONIC SHEET TESTER 210 (manufactured by Nomura Shoji) was used.

The T/Y ratio is preferably not higher than about 1.45, and more preferably not higher than about 1.40. When the T/Y ratio exceeds 1.45, the elongation of the base material becomes large, and it sometimes happens that the images are crazed.

There is no particular restriction on the pulp used for reducing the elongation as described above, and, for example, chemical pulps such as LBKP (hardwood bleached kraft pulp), NBKP (softwood bleached kraft pulp), LBSP (hardwood bleached sulfite pulp), NBSP (softwood bleached sulfite pulp) etc., and waste papers, etc., can be used. Also, dry pulp such as LBKP, etc., is suitable because in the case using the dry pulp, the wet elongation of the base paper can be effectively restrained.

For the base material in the invention, a filler can be used for improving the coating characteristics and controlling the opacity and the whiteness of the base material after coating. Examples of the filler used in the invention include inorganic fillers such as calcium carbonate heavy, calcium carbonate light, silicates such as kaolin, pyoroferrite, sericite, burned clay, and talc, and titanium dioxide, etc.; and organic fillers such as a urea resin, a styrene resin, etc., although the fillers used in the invention are not limited to them. There is no particular restriction on the compounding amount of the filler to the coating liquid but the compounding amount is properly from 0 to 25% by weight, and preferably from 0 to 20% by weight.

Various chemicals such as a size, etc., used for the base material in the invention can be used as internal or external additives. Examples of the size used in the invention include a rosin size, a synthetic size, a petroleum resin-base size, a neutral size, etc., and the size can be used as a combination with other proper size such as aluminum sulfate, a cationic starch, etc., fibers, and fixing agent. Taking into consideration of storage stability of papers after copying or printing by a copying machine, a printer, etc., of an electrophotographic system, neutral sizes such as alkenyl succinic anhydride, an alkylketene dimer, a neutral rosin, a petroleum-base size, an olefin-base resin, a styrene acryl-base resin, etc., are preferred.

The uppermost surface layer formed on the base material of the recording sheet of the invention is a coating layer made of a pigment and a binder resin or a toner accepting layer made of a transparent thermoplastic resin.

Examples of the above-described pigment used for the coating layer include mineral pigments such as calcium carbonate heavy, calcium carbonate light, kaolin, burned kaolin, structural kaolin, delamikaolin, talc, calcium sulfate, barium sulfate, silica, magnesium aluminosilicate, fine particulate calcium silicate, fine particulate magnesium carbonate, fine particulate calcium carbonate light, white carbon, bentonite, zeolite, selicite, smectites, etc.; and organic pigments such as a polystyrene resin, a styrene acryl copolymer resin, a urea resin, a melamine resin, an acrylic resin, a vinylidene chloride resin, a benzoguanamine resin, and the fine-void particles and through-hole type particles of these resins. They can be used singly or as a mixture of two or more kinds of them.

As the above-described binder resin used for the coating layer in this invention, a water-soluble and/or water-dispersible high molecular compound is used and examples thereof include starches such as a cationic starch, an amphoteric starch, am oxidized starch, an enzyme-denatured starch, a thermochemically denatured starch, an esterified starch, an etherified starch etc.; cellulose derivatives such as carboxymethyl cellulose, hydroxyethyl cellulose, methyl cellulose, etc.; natural or semi-synthetic high molecular compounds such as gelatin, casein, soy bean protein, a natural rubber, etc.; polydienes such as polyvinyl alcohol, isoprene, neoprene, polybutadiene, etc.; polyalkenes such as polybutene, polyisobutyrene, polypropylene, polyethylene, etc.; vinyl-base polymers and copolymers such as vinyl halide, vinyl acetate, styrene, (meth)acrylic acid, (meth) acrylic acid esters, (meth)acrylamide, methyl vinyl ether, etc.; synthetic rubber latexes such as styrene-butadiene-base ones, methyl methacrylate-butadiene-base ones, etc.; and synthetic high molecular compounds such as a polyurethane resin, a polyester resin, a polyamide resin, an olefin-maleic anhydride resin, a melamine resin, etc. In these binder resins, one or two or more kinds of them can be properly selected and used according to the desired quality of the electrophotographic transfer sheet.

It is proper that the compounding ratio of the binder resin to the coating layer is in the range of from about 5 to 50 parts by weight, and preferably from about 7 to 30 parts by weight to 100 parts by weight of the pigment in the coating layer. Also, various auxiliaries usually compounded with a pigment for coated papers, such as dispersing agents, thickeners, waterproofing agents, defoaming agents, water resisting agents, waxes, sizes, fluorescent brightening agents, coloring agents, etc., can be used as required.

The coating composition thus prepared is coated by using a coater generally used for forming coating, such as, for example, a blade coater, an air knife coater, a roll coater, a bar coater, a curtain coater, a die coater, a gravure coater, a reverse roll coater, a champlex coater, a brush coater, etc.

The coating amount of the coating liquid is properly selected according to the using purpose of the electrophotographic transfer sheet but to improve the graininess of the images formed, it is desirable that the coating amount is restrained to the minimum amount necessary for covering the fibrous material or the voids among the fibers of the base material. It is proper that the general coating amount is in the range of from about 4 to 20 $g/m^2$ per one surface.

According to the air permeability provided by JAPAN TAPPI No. 5, it is necessary that the value is measured by setting the uppermost surface layer of the recording sheet in contact with an air permeability measuring head for at least about 100 seconds, and preferably for at least about 500 seconds. When the air permeability is lower than 100 seconds, the roughness becomes undesirably remarkable on the images formed.

It is proper that the water content of the paper of the coated paper provided by JIS P8127 is adjusted to be from about 3.0 to 6.5%, and preferably from about 3.5 to 6.0%. When the water content of the paper is lower than 3.0%, the imaged portions are undesirably crazed. On the other hand, when the water content of the paper exceeds 6.5%, inferior transferring undesirably occurs.

The coating layer made of the pigment and the binder resin is formed on one surface or both surfaces of the base material, and it is possible to form an intermediate layer composed of one layer or, if necessary, two or more layers on the base material to from a multilayer structure. In addition, in the case of both-layer coating or a multilayer structure, it is not necessary that the kind and the coating amount of each coating liquid are the same, that is, the components of each coating liquid may be properly controlled and compounded according to a desired quality level, and there are no particular restrictions on the kinds and the coating amounts of the coating liquids. Also, on the coating layer formed on the back surface of the base material can be formed a coating layer made of a synthetic resin, a pigment, a binder resin, etc., an antistatic layer, etc., to impart thereto a curling prevention, a printability, a paper supplying adaptability, etc. Furthermore, by applying various workings, for example, post workings such as adhesion, a magnetism, a flame retardant, a heat resistance, an oil resistance, a lubricant prevention, etc., to the back surface of the transfer sheet, the transfer sheet can be, as a matter of course, used by adding thereto an adaptability for various uses.

When a toner accepting layer made of a transparent thermoplastic resin is used as the uppermost surface layer of the electrophotographic transfer sheet of the invention, the above-described wood free paper having a small elongation in the cross direction can be used as the base material but taking the surface property finishing after coating the thermoplastic resin into consideration, it is better that the surface of the base material to be coated is smooth. To this end, it is desirable to use the support made of a wood free paper the voids among the fibers of which are previously filled with a water-soluble resin (such as polyvinyl alcohol, cellulose-base resins, a starch, gelatin, casein, etc.) or a thermoplastic resin (such as polyester, polyethylene, polypropylene, etc.) or the support composed of the above-described coated paper, etc.

Examples of the transparent thermoplastic resin coated as the uppermost surface layer include a polystyrene resin, a styrene vinyl acetate-base resin, an acrylic resin, a styrene acrylic acid ester resin, a styrene methacrylic acid ester resin, polyurethane resin, polyester resin, etc. Among them, the use of a polyester resin is preferred in view of the adhesive property with color toners.

With regard to the transparent thermoplastic resin coated as the uppermost surface layer, the number average molecular weight Mn, the weight average molecular weight Mw, the softening temperature m.p., and the glass transition temperature Tg thereof can be properly selected according to the using purpose of the electrophotographic transfer sheet. Particularly, because the resin having a small molecular weight and a low softening temperature is liable to cause a phenomenon of attaching a fixing apparatus (offset phenomenon), it is better to select the above-described resin according to the fixing apparatus temperature, the fixing speed, etc., of a copying machine, a printer, etc., to be used. Also, when the above-described thermoplastic resin is coated, the elongation of the coated paper in the cross direction can be restrained, and in particular, when the resin having a large molecular weight is used, the restraining effect becomes large and the use of such a resin is effective for preventing the occurrence of crazing at the imaged portions.

It is better that the coating thickness of the thermoplastic resin coated as the uppermost surface layer is from about 3 to 20 $\mu$m, preferably from about 5 to 15 $\mu$m. When the coating thickness is less than 3 $\mu$m, an unevenness is liable to form on the surface of the uppermost layer and it becomes difficult to obtain beautiful images. Also, when the coating thickness exceeds 20 $\mu$m, the offset phenomenon is liable to occur at the fixing apparatus and, it becomes difficult to obtain appropriate transferring property in an environment of from high-humidity to that of low-humidity.

For coating the thermoplastic resin on a support such as a base material, etc., a general coating apparatus such as a reverse roll coater, a bar coater, a curtain coater, a die coater, a gravure coater, etc., can be used.

Also, the electrophotographic transfer sheet of the invention may be, subjected to smoothing treatment as required. The smoothing treatment is applied by a smoothing treatment apparatus such as a super calender, a gloss calender, a soft calender, etc. The form of an pressing apparatus, the number of pressing nips, the heating condition, etc., are properly controlled in accordance with an ordinary smoothing treatment apparatus. When the uppermost surface layer is a toner accepting layer made of the transparent thermoplastic resin, the surfaces smoothness of required to be at least about 3,000 seconds and when the upper most surface layer is made of a pigment and a binder resin, the surface smoothness is preferably at least about 500 seconds. When the surface smoothness is lower than the above-described range, roughness by the unevenness on the surface becomes undesirably striking.

It is proper that the water content (JIS P8127) of the coated paper having the toner accepting layer made of the thermoplastic resin is controlled to the range of from about 3.0 to 6.5%, preferably from about 3.5 to 6.0%. When the water content of the paper is lower than 3.0%, the imaged portions are undesirably crazed. On the other hand, when the water content exceeds 6.5%, inferior transferring undesirably occurs. Also, because the thermoplastic resin is usually used as a solution in an organic solvent for coating, the organic solvent is liable to remain on the transfer sheet. In this case, from the viewpoint of safety, it is preferred that the concentration of the remained solvent on the transfer sheet is about 0.07% by weight or lower. In addition, the above-described solvent concentration (weight %) is represented by (residual solvent amount)/(weight of transfer sheet).

Then, the toners used for the color image-forming process of this invention are explained. The toners used for an indirect dry full-color electrophotographic copying machine and printer are required to have good melting property and color mixing property at applying heat and it is desirable that the toners have a sharp melting property. To this end, as the binder resin used for the toners, a polyester resin is most suitable. It is proper that the number average molecular weight Mn of the polyester binder resin is from 1,000 to 9,000, preferably from 2,500 to 5,000. When Mn is less than 1,000, the toners are hard to be released from a fixing apparatus. Also, when Mn exceeds 9,000, color mixing becomes inferior and heat capacity of the fixing apparatus is increased, which are undesirable.

Each of the color toners used in the invention can be produced by kneading the toner-forming materials such as a binder resin made of polyester, a coloring agent (dye or pigment), a charge controlling agent, etc., grinding the kneaded mixture, and classifying.

Then, the color image-forming process is explained. FIG. 1 is a schematic cross-sectional view showing an embodiment of an electrophotographic apparatus used for the full-color image forming process of the invention. The electrophotographic apparatus is roughly constituted of a transfer material conveying system provided from the lower side of the apparatus to almost the central portion of the apparatus, a latent image forming portion provided adjacent to a transfer drum 10 disposed at almost the central portion of the apparatus, and a developing apparatus disposed adjacent to the latent image forming portion.

The transfer material conveying system is composed of supplying trays 15 and 16 formed at the lower side of the apparatus, paper supplying rollers 17 and 18 disposed almost above these trays, paper supplying guides 19 and 20 disposed adjacent to the paper supplying rollers, and a transfer material separating charging device 21 disposed near the outer periphery of the transfer drum 10 adjacent to the paper supplying guide 20. Also, the transfer material conveying system is further composed of transfer drum 10 rotatable to the direction indicated by an arrow having formed inside thereof a transfer device 11 and an electrode 24, contact rollers 23 in contact with the outer periphery of the drum 10, a conveying apparatus 13, a fixing apparatus 14 disposed adjacent to the end side of the conveying direction of the conveying apparatus 13, and a removable discharging tray 22.

The latent image forming portion is equipped with an electrostatic latent image holder (photoreceptor drum) 1 rotatable to the direction of an arrow disposed in such a manner that the outer periphery thereof is in contact with the outer periphery of the above-described transfer drum 10, a charging device 8 disposed near the outer periphery of the electrostatic latent image holder, a writing apparatus 9 having an image exposure unit such as a laser beam scanner for forming an electrostatic latent image on the surface of the outer periphery of the electrostatic latent image holder and an image exposing light reflecting unit such as a polygon mirror, and a cleaning device 12.

The developing apparatus is constituted of developer holders 7 and housings 6, and is equipped with a black developing unit 2, a magenta developing unit 3, a cyan developing unit 4, and a yellow developing unit 5 for visualizing (developing) an electrostatic image formed on the surface of the outer periphery of the electrostatic latent image holder at the positions facing the surface of the outer periphery of the electrostatic latent image holder 1.

The sequence of forming images by the electrophotographic apparatus having the above-described construction is explained by illustrating the case of a full-color mode.

When the above-described electrostatic latent image holder 1 is rotated in the direction of an arrow, the surface of the electrostatic latent image holder is uniformly charged by the charging device 8. When uniform charging is performed by the charging device 8, an electrostatic latent image is formed on the electrostatic latent image holder 1 by a laser light modulated by a black image signal of an original (not shown) through the writing apparatus 9 and the electrostatic latent image is developed by the black developing unit 2.

On the other hand, a transfer material conveyed from the supplying tray 15 or 16 via the paper supplying roller 17 or 18 and the paper supplying guide 19 or 20 is electrostatically wound round the transfer drum 10 by the electrode 24 facing the contact roller 23. The transfer drum 10 is rotated in the direction of an arrow synchronizing with the electrostatic latent image holder 1 and the visualized toner image developed by the black developing unit 2 is transferred by the transferring device 11 at the site where the surface of the outer periphery of the electrostatic latent image holder 1 is in contact with the surface of the outer periphery of the transfer drum 10. The transfer drum 10 continues the rotation as it is to prepare for the transfer of the next color (magenta in FIG. 1).

The electrostatic latent image holder 1 is static-eliminated by a charging device for static elimination (not shown), after cleaned by the cleaning device 12, is electrostatically charged again by the charging device 8, and irradiated with a latent image-forming light as described above by a next magenta image signal. An electrostatic latent image formed by the image exposure of the magenta image signal is developed by the magenta developing unit 3 to form a visualized toner image. Then, successively the process as described above is conducted for a cyan color and a yellow color, when the transfers of four colors are finished, the multi-color visualized image formed on the transfer material is static-eliminated by the charging device 21, is sent to the fixing apparatus 14 by the paper conveying apparatus 13, is fixed by heat and pressure to finish a series of the full-color image forming sequence.

The main portion of the above-described fixing apparatus 14 is constituted of a heat roll 14*a* and a pressure roll 14*b* each having the same structure. The heat roll 14*a* is equipped with a quartz lamp of 500 W inside thereof and has a construction that the surface of a substrate roll made of a steel-made core material having an outer diameter of 44 mm is coated with a fluorine-base rubber (e.g. , Bayton rubber, made by E.I. Du Pont de Nemours and Company) of a JIS rubber hardness of 60 and a thickness of 40 $\mu$m via a proper primer. The pressure roll has the same construction as the heat roll except that the surface of a substrate roll made of a steel-made core having an outer diameter of 48 mm is coated with a silicone rubber-made inside elastic layer having a thickness of 1 mm.

The above-described heat roll is equipped with a unit for supplying a releasing agent such as dimethylpolysiloxane having a functional group (e.g., an amino group) to improve the surface of the above-described fluorine-base rubber to a high releasing type surface and is contacted with a silicone rubber-made oil donor roll. The oil donor roll is supplied with a releasing agent by an oil pickup roll immersed in an oil pan.

The heat roll 14*a* and the pressure roll 14*b* are press-contacted with each other by a pressing mechanism and at the central portion, a nip width of 6 mm is formed. Furthermore, the surface temperature of both rolls is set to 150° C. and each roll is constructed so that the roll is rotated in the direction of an arrow at a surface speed of 160 mm/second. In this case, however, for a paper having the basis weight exceeding 105 g/m$^2$, the rolls are constructed so that each roll is rotated at a surface speed of 60 mm/second.

Then, the invention is specifically explained by the following examples but the invention is not limited by these examples. In addition, all "parts" and "%" in the examples and the comparative examples, unless otherwise indicated, are "solid component weight parts" and "weight %", respectively.

EXAMPLE 1

Preparation of coated paper having the uppermost surface of the coating layer made of pigment and binder resin.

(Preparation of base material)

Using 100 parts of a pulp of LBKP (freeness (CSF)=500 ml) as a raw material, wherein 40 parts thereof was a dry pulp (solid component), and by compounding the pulp with 10 parts of calcium carbonate light (TP 121, made by Okutama Kogyo) per the pulp (the same applies to the following), 0.08 part of alkenyl succinic anhydride (Fibran 81, made by National Starch and Chemical) as an internal size, and 0.5 part of a cationic starch (Ace K, made by Oji Cornstarch), a stuff was prepared.

By using the stuff, a paper was manufactured by a wire multi-pipe type paper machine while controlling the Jet/Wire ratio and the Wire speed so that the fiber orientation ratio (T/Y ratio) became 1.05 and the paper was dried in a drying step while applying a restrictive force to the perpendicular direction (cross direction) to the paper manufacturing flowing direction, a base material having a finished water content of 5% and a basis weight of 125 g/m$^2$ was obtained.

(Preparation of coating liquid) To 60 parts of kaolin (UW-90, made by Engelhard) and 40 parts of calcium carbonate light (Univer 70, made by Shiraishi Kogyo) was added 0.2 part (solid component ratio to the pigment) of sodium polyacrylate (Alon A-9, made by Toagosei) and the mixture was dispersed in water using a coarless dispersing machine to prepare a pigment slurry. To the pigment slurry were added 3.0 parts of an oxidized starch (Ace K, made by Oji Cornstarch) and 15 parts of a styrene butadiene copolymer latex (OX 1060, made by Nippon Zeon) followed by stirring and further water was added to the mixture to prepare a coating liquid having a solid component concentration of 40%.

(Formation of coating layer on the base material)

The coating liquid obtained was coated on both surfaces of the above-described base material using a bar coater such that the dry weight per one surface became 15 g/m$^2$, dried, and the surface of the base material thus coated was smoothened by passing the dried base material through a press nip composed of a metal roll and an elastic roll to obtain a transfer sheet having a basis weight of 155 g/m$^2$, a water content of 5%, and a gas permeability of about 2,000 seconds.

(Evaluation of the transfer sheet)

The elongation of the above-described transfer sheet in the cross direction measured was 0.60%. The transfer sheet was set to the electrophotographic apparatus shown in FIG. 1 and a picturing test was carried out. As the picturing condition, the electrophotographic apparatus was controlled so that as toner amounts of the input dot area ratio 100 parts % on the transfer sheet, black became 1.0 mg/cm$^2$ and each of yellow, magenta, and cyan became 0.65 mg/cm$^2$. Also, the chart used for picturing has primary colors of yellow, magenta, and cyan, secondary colors of red, green, and blue, and tertiary colors of yellow, magenta, and cyan and has a dot area ratios of from 0 to 100%.

When the transfer sheet of Example 1 was evaluated by the following evaluation method, the crazing of the imaged portion was (A), the coloring property was (A), roughness was (A), and the transferring property was (A).

(Crazing evaluation)

In the evaluation of crazing, the above-described transfer sheet having formed images thereon was kept in the state of being placed evenly at a temperature of 28° C., 85% RH for 8 hours, whether or not the tertiary color 100% toner portion was crazed was observed, and the results were evaluated as follows:

(A): No crazing.

(B): Crazed but crazing was in an allowable level.

(C): Crazing occurred.

(Coloring property evaluation of imaged portion)

With regard to the coloring property evaluation of the imaged portion, the reflection density of the magenta 100% solid portion was measured by X-Rite 938 (filter: status A) and the results were evaluated as follows.

(A): Density was at least 1.9 and the coloring property was good.

(B): Density was at least 1.9 and lower than 1.9, and the coloring property was in an allowable level.

(C): Density was lower than 1.6 and the coloring property was bad.

(Roughness evaluation of imaged portion)

With regard to the roughness of the imaged portion, roughness of the cyan 100% portion was visually observed and evaluated as follows.

(A): No roughness.

(B): Roughness was observed a little but was in a non-problematic level.

(C): Roughness was observed.

(Evaluation of transferring property)

With regard to the evaluation of the transferring property, using the electrophotographic apparatus and the standard chart controlled as in the above-described (evaluation of the transfer sheet) and the transferring property after printing was visually evaluated as follows.

(A): No inferior transferred portion.

(B): Inferior transferred portion was observed a little but was in a non-problematic level.

(C): Inferior transfer occurred.

EXAMPLE 2

Preparation of coated paper having the uppermost surface of the coating layer made of pigment and binder resin.

(Preparation of base material)

Using 100 parts of a pulp of LBKP (freeness (CSF)=500 ml) as a raw material, 50 parts thereof was a dry pulp (solid component), and by compounding the pulp with 10 parts of calcium carbonate light (TP 121, made by Okutama Kogyo) per the pulp (the same applies to the following), 0.08 part of alkenyl succinic anhydride (Fibran 81, made by National Starch and Chemical) as an internal size, and 0.5 part of a cationic starch (Ace K, made by Oji Cornstarch), a stuff was prepared.

By using the stuff, a paper was manufactured by a wire multi-pipe type paper machine while controlling the Jet/Wire ratio and the Wire speed so that the fiber orientation ratio (T/Y ratio) became 1.05 and the paper was dried in a drying step while applying a restrictive force to the perpendicular direction (cross direction) to the paper manufacturing flowing direction, a base material having a finished water content of 5% and a basis weight of 125 g/m$^2$ was obtained.

(Formation of coating layer on the base material)

Using the same coating liquid as in Example 1, the coating liquid was coated on the base material by the same method as in Example 1 followed by drying, and the surface of the coated base material was smoothened by passing through a press nip composed of a metal roll and an elastic roll to prepare a transfer sheet having a basis weight of 155 g/m$^2$ a water content of 5%, and a air permeability of about 2,000 seconds.

(Evaluation of the transfer sheet)

The elongation of the transfer sheet obtained in the cross direction measured by the same manner as in Example 1 was 0.58%, crazing of the imaged portion was (A), the coloring property was (A), roughness was (A), and the transferring property was (A).

EXAMPLE 3

Preparation of coated paper having the uppermost surface of the coating layer made of pigment and binder resin (Preparation of base material)

Using 100 parts of a pulp of LBKP (freeness (CSF)=500 ml) as a raw material, 30 parts thereof was a dry pulp (solid component), and by compounding the pulp with 10 parts of calcium carbonate light (TP 121, made by Okutama Kogyo) per the pulp (the same applies to the following), 0.08 part of alkenyl succinic anhydride (Fibran 81, made by National Starch and Chemical) as an internal size, and 0.5 part of a cationic starch (Ace K, made by Oji Cornstarch), a stuff was prepared.

By using the stuff, a paper was manufactured by a wire multi-pipe type paper machine while controlling the Jet/Wire ratio and the Wire speed so that the fiber orientation ratio (T/Y ratio) became 1.05 and the paper was dried in a drying step while applying a restrictive force to the perpendicular direction (cross direction) to the paper manufacturing flowing direction, a base material having a finished water content of 5% and a basis weight of 125 g/m$^2$ was obtained.

(Formation of coating layer on the base material)

Using the same coating liquid as in Example 1, the coating liquid was coated on the base material by the same method as in Example 1 followed by drying, and the surface of the coated base material was smoothened by passing through a press nip composed of a metal roll and an elastic roll to prepare a transfer sheet having a basis weight of 155 g/m$^2$, a water content of 5%, and a air permeability of about 2,000 seconds.

(Evaluation of the transfer sheet)

The elongation of the transfer sheet obtained in the cross direction measured by the same manner as in Example 1 was 0.64%, crazing of the imaged portion was (B), the coloring property was (A), roughness was (A), and the transferring property was (A).

EXAMPLE 4

Preparation of coated paper having the uppermost surface of the coating layer made of pigment and binder resin The coating liquid as in Example 1 was coated on both surfaces of the base material as in Example 3 using a bar coater so that the dry weight per one surface became 4 g/m$^2$ followed by drying, and the surface of the coated base material was smoothened by passing through a press nip composed of a metal roll and an elastic roll to prepare a transfer sheet having a basis weight of 133 g/m$^2$, a water content of 5%, and a air permeability of about 110 seconds.

(Evaluation of the transfer sheet)

The elongation of the transfer sheet obtained in the cross direction measured by the same manner as in Example 1 was 0.64%, crazing of the imaged portion was (A), the coloring property was (B), roughness was (B), and the transferring property was (A).

EXAMPLE 5

Preparation of coated paper having the uppermost surface of the coating layer made of pigment and binder resin By using the same coating liquid and the base material as in Example 1, the coating liquid was coated on both surfaces of the base material using a bar coater so that the dry weight per one surface became 15 g/m$^2$ followed by drying, and the surface of the coated base material was smoothened by passing through a press nip composed of a metal roll and an elastic roll to prepare a transfer sheet having a basis weight of 155 g/m$^2$, a water content of 3.5%, and a air permeability of about 2,000 seconds.

(Evaluation of the transfer sheet)

The elongation of the transfer sheet obtained in the cross direction measured by the same manner as in Example 1 was 0.60%, crazing of the imaged portion was (B), the coloring property was (A), roughness was (A), and the transferring property was (A).

EXAMPLE 6

Preparation of coated paper having the uppermost surface of the coating layer made of pigment and binder resin By using the same coating liquid and the base material as in Example 1, the coating liquid was coated on both surfaces of the base material using a bar coater so that the dry weight per one surface became 15 g/m$^2$ followed by drying, and the surface of the coated base material was smoothened by passing through a press nip composed of a metal roll and an elastic roll to prepare a transfer sheet having a basis weight of 155 g/m$^2$, a water content of 6%, and a air permeability of about 2,000 seconds.

(Evaluation of the transfer sheet)

The elongation of the transfer sheet obtained in the cross direction measured by the same manner as in Example 1 was 0.60%, crazing of the imaged portion was (A), the coloring property was (A), roughness was (A), and the transferring property was (B).

Comparative Example 1

Preparation of coated paper having the uppermost surface of the coating layer made of pigment and binder resin (Preparation of base material)

Using 100 parts of a pulp of LBKP (freeness (CSF)=500 ml) as a raw material, and by compounding the pulp with 10 parts of calcium carbonate light (TP 121, made by Okutama Kogyo) per the pulp (the same applies to the following), 0.08 part of alkenyl succinic anhydride (Fibran 81, made by National Starch and Chemical) as an internal additive, and 0.5 part of a cationic starch (Ace K, made by Oji Cornstarch), a stuff was prepared.

By using the stuff, a paper was manufactured by a wire multi-pipe type paper machine while controlling the Jet/Wire ratio and the Wire speed so that the fiber orientation ratio (T/Y ratio) became 1.35 and a base material having a finished water content of 5% and a basis weight of 125 g/m$^2$ was obtained.

(Formation of coating layer on the base material)

Using the same coating liquid as in Example 1, the coating liquid was coated on the base material by the same method as in Example 1 followed by drying, and the surface finished to prepare a transfer sheet having a basis weight of 155 g/m$^2$, a water content of 5%, and a air permeability of about 2,000 seconds.

(Evaluation of the transfer sheet)

The elongation of the transfer sheet obtained in the cross direction measured by the same manner as in Example 1 was 0.85%, crazing of the imaged portion was (C), the coloring property was (A), roughness was (A), and the transferring property was (A).

Comparative Example 2

Preparation of coated paper having the uppermost surface of the coating layer made of pigment and binder resin (Preparation of transfer sheet)

Using the same base material and coating liquid as in Example 1, the coating liquid was coated on both surfaces of the base material using a bar coater so that the dry weight per one surface became 15 g/m$^2$ followed by drying, and the surface of the coated base material was smoothened by passing the base material through a press nip composed of a metal roll and an elastic roll to prepare a transfer sheet having basis weight of 155 g/m$^2$, a water content of 2.5%, and a air permeability of about 2,000 seconds.

(Evaluation of the transfer sheet)

The elongation of the transfer sheet obtained in the cross direction measured by the same manner as in Example 1 was 0.60%, crazing of the imaged portion was (C), the coloring property was (A), roughness was (A), and the transferring property was (A).

Comparative Example 3

Preparation of coated paper having the uppermost surface of the coating layer made of pigment and binder resin (Preparation of transfer sheet)

Using the same base material and coating liquid as in Example 1, the coating liquid was coated on both surfaces of the base material using a bar coater so that the dry weight per one surface became 15 g/m$^2$ followed by drying, and the surface of the coated base material was smoothened by passing the base material through a press nip composed of a metal roll and an elastic roll to prepare a transfer sheet having basis weight of 155 g/m$^2$, a water content of 7.0%, and a air permeability of about 2,000 seconds.

(Evaluation of the transfer sheet)

The elongation of the transfer sheet obtained in the cross direction measured by the same manner as in Example 1 was 0.60%, crazing of the imaged portion was (A), the coloring property was (A), roughness was (A), and the transferring property was (C).

Comparative Example 4

Commercially available coated paper for printing

Using a commercially available coated paper for printing, OK Top Coat (basis weight 157 g/m$^2$, made by Oji Paper), the same evaluations as in Example 1 were carried out.

(Evaluation of the transfer sheet)

The elongation of the OK Top Coat paper in the cross direction measured was 0.85%, crazing at the imaged portion was (C), the coloring property was (A), roughness was (A), and the transferring property was (A).

The properties and the evaluation results of the transfer sheets prepared in Examples 1 to 6 and Comparative Examples 1 to 4 are summarized in Table 1 and Table 2 below, respectively.

TABLE 1

| | Example 1 | Example 2 | Example 3 | Example 4 | Example 5 | Example 6 |
|---|---|---|---|---|---|---|
| Dry pulp amount (%) in raw material of base material | 40 | 50 | 30 | 30 | 40 | 40 |
| Fiber orientation ratio (T/Y) of base material | 1.05 | 1.05 | 1.05 | 1.05 | 1.05 | 1.05 |
| Application of constraint at drying base material | applied | applied | applied | applied | applied | applied |
| Elongation (%) in cross direction | 0.60 | 0.58 | 0.61 | 0.61 | 0.60 | 0.60 |
| Water content (%) of paper | 5 | 5 | 5 | 5 | 3.5 | 6 |
| Air permeability (sec.) | 2,000 | 2,000 | 2,000 | 110 | 2,000 | 2,000 |
| Crazing of imaged portion (28° C., 85% RH) | (A) | (A) | (B) | (A) | (B) | (A) |
| Coloring property at imaged portion | (A) | (A) | (A) | (B) | (A) | (A) |
| Roughness of imaged portion | (A) | (A) | (A) | (B) | (A) | (A) |
| Transferring property | (A) | (A) | (A) | (A) | (A) | (B) |

TABLE 2

| | Comp. Ex. 1 | Comp. Ex. 2 | Comp. Ex. 3 | Comp. Ex. 4 |
|---|---|---|---|---|
| Dry pulp amount (%) in raw material of base material | 0 | 40 | 30 | — |
| Fiber aligning ratio (T/Y) of base material | 1.35 | 1.05 | 1.05 | — |
| Application of restriction at drying base material | none | applied | applied | — |
| Elongation (%) in cross direction | 0.85 | 0.60 | 0.60 | 0.85 |
| Water content (%) of paper | 5 | 2.5 | 7.0 | 5 |
| Gas permeability (sec.) | 2,000 | 2,000 | 2,000 | 2200 |
| Crazing of imaged portion (28° C., 85% RH) | (C) | (C) | (A) | (C) |
| Coloring property at imaged portion | (A) | (A) | (A) | (A) |
| Roughness of imaged portion | (A) | (A) | (A) | (A) |
| Transferring property | (A) | (A) | (C) | (A) |

Comp. Ex.: Comparative Example

EXAMPLE 7

Preparation of coated paper having the uppermost surface made of transparent thermoplastic resin (Preparation of transfer sheet)

Using the transfer sheet prepared in Example 1 as a support, after coating a polyester resin (TP 220, number average molecular weight Mn: 16,000, made by Nippon Synthetic Chemical Industry) on one surface of the support using a gravure coater so that the dry weight became 10 g/m$^2$, the coated support was controlled so that the water content became 4.5% to prepare an electrophotographic transfer sheet having a basis weight of 165 g/m$^2$ and a air permeability of at least 140,000 seconds.

(Evaluation of the transfer sheet)

The elongation of the transfer sheet obtained in the cross direction measured by the same manner as in Example 1 was 0.40%, crazing of the imaged portion was (A), the coloring property was (A), roughness was (A), and the transferring property was (A).

EXAMPLE 8

Preparation of coated paper having the uppermost surface made of transparent thermoplastic resin (Preparation of transfer sheet)

Using the transfer sheet prepared in Comparative Example 1 as a support, after coating a polyester resin (ES 670, number average molecular weight Mn: 6,000, made by Dainippon Ink & Chemicals) on one surface of the support using a gravure coater so that the dry weight became 10 g/m$^2$, the coated support was controlled so that the water content became 4.5% to prepare an electrophotographic transfer sheet having a basis weight of 165 g/m$^2$ and a air permeability of at least 140,000 seconds.

(Evaluation of the transfer sheet)

The elongation of the transfer sheet obtained in the cross direction measured by the same manner as in Example 1 was 0.64%, crazing of the imaged portion was (B), the coloring property was (A), roughness was (A), and the transferring property was (A).

EXAMPLE 9

Preparation of coated paper having the uppermost surface made of transparent thermoplastic resin Using the transfer sheet prepared in Comparative Example 1 as a support, after coating a polyester resin (TP 220, number average molecular weight Mn: 16,000, made by Nippon Synthetic Chemical Industry) on one surface of the support using a gravure coater so that the dry weight became 10 g/m$^2$, the coated support was controlled so that the water content became 4.5% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.54%, crazing of the imaged portion was (A), the coloring property was (A), roughness was (A), and the transferring property was (A).

EXAMPLE 10

Preparation of coated paper having the uppermost surface made of transparent thermoplastic resin Using the transfer sheet prepared in Example 4 as a support, after coating a polyester resin (TP 220, molecular weight Mn: 16000, made by Nippon Synthetic Chemical Industry) on one surface of the support using a gravure coater so that the dry weight became 10 g/m$^2$, the coated support was controlled so that the water content became 4.5% to prepare an electrophotographic transfer sheet having a basis weight of 165 g/m$^2$ and a air permeability of at least 10,500 seconds.

The elongation of the transfer sheet obtained in the cross direction measured by the same manner as in Example 1 was 0.45%, crazing of the imaged portion was (A), the coloring property was (A), roughness was (B), and the transferring property was (A).

EXAMPLE 11

Preparation of coated paper having the uppermost surface made of transparent thermoplastic resin Using the transfer sheet prepared in Example 1 as a support, after coating a polyester resin (TP 220, molecular weight Mn: 16,000, made by Nippon Synthetic Chemical Industry) on one surface of the support using a gravure coater so that the dry weight became 10 g/m$^2$, the coated support was controlled so that the water content became 3.5% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.40%, crazing of the imaged portion was (B), the coloring property was (A), roughness was (A), and the transferring property was (A).

EXAMPLE 12

Preparation of coated paper having the uppermost surface made of transparent thermoplastic resin Using the transfer sheet prepared in Example 1 as a support, after coating a polyester resin (TP 220, molecular weight Mn: 16,000, made by Nippon Synthetic Chemical Industry) on one surface of the support using a gravure coater so that the dry weight became 10 g/m$^2$, the coated support was controlled so that the water content became 6% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.40%, crazing of the imaged portion was (A), the coloring property was (A), roughness was (A), and the transferring property was (B).

Comparative Example 5

Preparation of coated paper having the uppermost surface made of transparent thermoplastic resin (Preparation of base material)

Using 100 parts of a pulp of LBKP (freeness (CSF)=500 ml) as a raw material, and the pulp was compounded with 10 parts of calcium carbonate light (TP 121, made by Okutama Kogyo) per the pulp (the same applies to the following), 0.08 part of alkenyl succinic anhydride (Fibran 81, made by National Starch and Chemical) as an internal additive, and 0.5 part of a cationic starch (Ace K, made by Oji Cornstarch).

By using the stuff thus prepared, a paper was manufactured by a wire multi-pipe type paper machine while controlling the Jet/Wire ratio and the Wire speed so that the fiber orientation ratio (T/Y ratio) became 1.5 and after drying, a base material having a finished water content of 5% and a basis weight of 125 g/m$^2$ was obtained.

Using the same coating liquid as in Example 1, the coating liquid was coated on the base material by the same method as in Example 1 followed by drying, and the surface finishing was applied to prepare a support having a basis weight of 155 g/m$^2$. After coating a polyester resin (TP 220, molecular weight Mn: 16,000, made by Nippon Synthetic Chemical Industry) on one surface of the support using a gravure coater so that the dry weight became 10 g/m$^2$, the coated support was controlled so that the water content became 4.5% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.75%, crazing of the imaged portion was (C), the coloring property was (A), roughness was (A), and the transferring property was (A).

Comparative Example 6

Preparation of coated paper having the uppermost surface made of transparent thermoplastic resin Using a commercially available coat paper for printing, OK Top Coat having a basis weight of 157 g/m$^2$ (made by Oji Paper) as a support, after coating a polyester resin (ES 670, made by Dainippon Ink & Chemicals) on one surface of the support using a gravure coater so that the dry weight became 10 g/m$^2$, the coated support was controlled so that the water content became 4.5% to prepare an electrophotographic transfer sheet having a basis weight of 167 g/m$^2$ and a air permeability of about 140,000 seconds.

The elongation of the transfer sheet obtained in the cross direction measured by the same manner as in Example 1 was 0.79%, crazing of the imaged portion was (C), the coloring property was (A), roughness was (A), and the transferring property was (A).

Comparative Example 7

Preparation of coated paper having the uppermost surface made of transparent thermoplastic resin Using the transfer sheet prepared in Example 1 as a support, after coating a polyester resin (TP 220, molecular weight Mn: 16000, made by The Nippon Synthetic Chemical Industry Co., Ltd.) on one surface of the support using a gravure coater so that the dry weight became 10 g/m$^2$, the coated support was controlled so that the water content became 2.5% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.40%, crazing of the imaged portion was (C), the coloring property was (A), roughness was (A), and the transferring property was (A).

Comparative Example 8

Preparation of coated paper having the uppermost surface made of transparent thermoplastic resin Using the transfer sheet prepared in Example 1 as a support, after coating a polyester resin (TP 220, molecular weight Mn: 16,000, made by Nippon Synthetic Chemical Industry) on one surface of the support using a gravure coater so that the dry weight became 10 g/m$^2$, the coated support was controlled so that the water content became 7.0% to prepare an electrophotographic transfer sheet having a basis weight of 165 g/m$^2$ and a air permeability of at least 140,000 seconds.

The elongation of the transfer sheet obtained in the cross direction measured by the same manner as in Example 1 was 0.40%, crazing of the imaged portion was (A), the coloring property was (A), roughness was (A), and the transferring property was (C).

The properties and the evaluated results of the transfer sheets prepared in Examples 7 to 12 and Comparative Examples 5 to 8 are summarized in Table 3 and Table 4, respectively.

TABLE 3

| | Example 7 | Example 8 | Example 9 | Example 10 | Example 11 | Example 12 |
|---|---|---|---|---|---|---|
| Dry pulp amount (%) in raw material of base material | 40 | 0 | 0 | 30 | 40 | 40 |
| Fiber orientation ratio (T/Y) of base material | 1.05 | 1.35 | 1.35 | 1.05 | 1.05 | 1.05 |
| Application of constraint at drying base material | applied | none | none | applied | applied | applied |
| Kind of thermoplastic resin | polyester | polyester | polyester | polyester | polyester | polyester |
| Number average molecular weight Mn of thermoplastic resin | 16,000 | 16,000 | 16,000 | 16,000 | 16,000 | 16,000 |
| Elongation (%) in cross direction | 0.40 | 0.64 | 0.54 | 0.45 | 0.40 | 0.40 |
| Water content (%) of paper | 4.5 | 4.5 | 4.5 | 4.5 | 3.5 | 6.0 |
| Air permeability (sec.) | ≧140,000 | ≧140,000 | ≧140,000 | 10,500 | ≧140,000 | ≧140,000 |
| Crazing of imaged portion (28° C., 85% RH) | (A) | (B) | (A) | (A) | (B) | (A) |
| Coloring property at imaged portion | (A) | (A) | (A) | (A) | (A) | (A) |
| Roughness of imaged portion | (A) | (A) | (A) | (B) | (A) | (A) |
| Transferring property | (A) | (A) | (A) | (A) | (A) | (B) |

TABLE 4

| | Comp. Ex. 5 | Comp. Ex. 6 | Comp. Ex. 7 | Comp. Ex. 8 |
|---|---|---|---|---|
| Dry pulp amount (%) in raw material of base material | 0 | — | 40 | 40 |
| Fiber orientation ratio (T/Y) of base material | 1.50 | — | 1.05 | 1.05 |
| Application of constraint at drying base material | none | — | applied | applied |
| Kind of thermoplastic resin | polyester | polyester | polyester | polyester |
| Number average molecular weight Mn of thermoplastic resin | 16,000 | 6,000 | 16,000 | 16,000 |
| Elongation (%) in cross direction | 0.75 | 0.79 | 0.40 | 0.40 |
| Water content (%) of paper | 4.5 | 4.5 | 2.5 | 7.0 |
| Air permeability (sec.) | ≧140,000 | ≧140,000 | ≧140,000 | ≧140,000 |
| Crazing of imaged portion (28° C., 85% RH) | (C) | (C) | (C) | (A) |
| Coloring property at imaged portion | (A) | (A) | (A) | (A) |
| Roughness of imaged portion | (A) | (A) | (A) | (A) |
| Transferring property | (A) | (A) | (A) | (C) |

Comp. Ex.: Comparative Example

In the invention, by employing the above-described construction, the occurrence of crazing at the fixed toner image portion can be prevented even under a high humidity and full-color images having a high coloring property and having no roughness can be obtained.

What is claimed is:

1. An electrophotographic transfer sheet comprising a base material made of pulp fibers as a main body having formed on at least one surface thereof a coating layer, wherein elongation thereof in a cross direction, when measured after humidification that increases the humidity from 25% RH to 90% RH at a temperature of 20° C., is not higher than 0.65% and a water content of the sheet at opening a package thereof as measured according to JIS P8127 is approximately in the range from 3.0 to 6.5%, and the basis weight of the sheet is at least 133 g/m$^2$.

2. The electrophotographic transfer sheet according to claim 1, wherein the coating layer is a transparent resin layer made of a thermoplastic resin as a main constituent.

3. The electrophotographic transfer sheet according to claim 1, wherein the coating layer contains a pigment and a binder resin, and a transparent resin layer made of a thermoplastic resin as a main constituent is further formed on the surface of the coating layer.

4. An electrophotographic transfer sheet comprising a base material made of pulp fibers as a main body, wherein an elongation thereof in a cross direction, when measured after humidification that increases the humidity from 25% RH to 90% RH at a temperature of 20° C., is not higher than 0.65% and at least about 30% by weight of the pulp fibers are a dry pulp, and a water content of the sheet at opening a package thereof as measured according to JIS P8127 is approximately in the range from 3.0 to 6.5%, and the basis weight of the sheet is at least 133 g/m$^2$.

5. The electrophotographic transfer sheet according to claim 4, wherein the coating layer is a transparent resin layer made of a thermoplastic resin as a main constituent.

6. The electrophotographic transfer sheet according to claim 4, wherein the coating layer contains a pigment and a binder resin, and a transparent resin layer made of a thermoplastic resin as a main constituent is further formed on the surface of the coating layer.

7. An electrophotographic transfer sheet comprising a base material made of pulp fibers as a main body having formed on at least one surface thereof a coating layer, wherein the coating layer is a transparent resin layer made of a thermoplastic resin as a main constituent, a fiber orientation ratio of the base material is approximately in the range from 1.05 to 1.45, and an elongation thereof in a cross direction, when measured after humidification that increases the humidity from 25% RH to 90% RH at a temperature of 20° C., is not higher than 0.65% and a water content of the sheet at opening a package thereof as measured according to JIS P8127 is approximately in the range from 3.0 to 6.5%, and the basis weight of the sheet is at least 133 g/m$^2$.

8. The electrophotographic transfer sheet according to claim 7, wherein a coating layer containing a pigment and a binder resin is further formed between the base material and the transparent resin layer.

9. The electrophotographic transfer sheet according to claim 2, wherein an air permeability of the transfer sheet as measured according to JAPAN TAPPI No. 5 is at least about 10,000 seconds.

10. The electrophotographic transfer sheet according to claim 5, wherein an air permeability of the transfer sheet as measured according to JAPAN TAPPI No. 5 is at least about.10, 000 seconds.

11. The electrophotographic transfer sheet according to claim 7, wherein an air permeability of the transfer sheet as measured according to JAPAN TAPPI No. 5 is at least about 10,000 seconds.

12. The electrophotographic transfer sheet according to claim 1, wherein the base material is formed by drying while applying a restrictive force to the cross direction thereof.

13. The electrophotographic transfer sheet according to claim 4, wherein the base material is formed by drying while applying a restrictive force to the cross direction thereof.

14. The electrophotographic transfer sheet according to claim 7, wherein the base material is formed by drying while applying a restrictive force to the cross direction thereof.

* * * * *